United States Patent
Yamakawa et al.

(10) Patent No.: US 6,928,980 B2
(45) Date of Patent: Aug. 16, 2005

(54) CONTROL DEVICE FOR SPARK-IGNITION ENGINE

(75) Inventors: Masahisa Yamakawa, Fuchu-cho (JP); Keiji Araki, Fuchu-cho (JP); Takayoshi Hayashi, Fuchu-cho (JP); Toshiaki Nishimoto, Fuchu-cho (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 10/944,710

(22) Filed: Sep. 21, 2004

(65) Prior Publication Data

US 2005/0066918 A1 Mar. 31, 2005

(30) Foreign Application Priority Data

Sep. 30, 2003 (JP) ........................................ 2003-340732

(51) Int. Cl.[7] ........................... F02B 75/02; F02M 35/10
(52) U.S. Cl. ............. 123/311; 123/184.26; 123/184.49; 123/184.59
(58) Field of Search ................................. 123/311, 317, 123/294, 90.1, 184.21, 184.26, 184.36, 184.49, 184.59

(56) References Cited

U.S. PATENT DOCUMENTS

| | | | | |
|---|---|---|---|---|
| 5,682,870 A | * | 11/1997 | Motoyama | .................. 123/703 |
| 2004/0060527 A1 | | 4/2004 | Hitomi et al. | |
| 2004/0065278 A1 | | 4/2004 | Nishimoto et al. | |
| 2004/0065279 A1 | | 4/2004 | Hitomi et al. | |
| 2004/0129245 A1 | | 7/2004 | Hitomi et al. | |

FOREIGN PATENT DOCUMENTS

| | | |
|---|---|---|
| JP | 10-274085 | 10/1998 |
| JP | 2003-227370 | 8/2003 |
| JP | 2003-227377 | 8/2003 |
| JP | 2003-227383 | 8/2003 |
| JP | 2004-27961 | 1/2004 |
| WO | WO-3/064837 A1 | 8/2003 |
| WO | WO 3/064838 A1 | 8/2003 |
| WO | WO-3/067066 A1 | 8/2003 |

OTHER PUBLICATIONS

U.S. Patent Application No. 10/859,605 filed Jun. 3, 2004.

* cited by examiner

*Primary Examiner*—Bibhu Mohanty
(74) *Attorney, Agent, or Firm*—Nixon Peabody LLP; Donald R. Studebaker

(57) ABSTRACT

A control device switches an engine between normal operation mode and special operation mode. In the normal operation mode, an independent cylinder configuration is formed to produce combustion independently in individual cylinders. In the special operation mode, a two-cylinder interconnect configuration is formed so that burned gas discharged from preceding cylinders currently in an exhaust stroke is introduced into following cylinders currently in an intake stroke through intercylinder gas channels, a lean mixture having a high air-fuel ratio is combusted in the preceding cylinders, and a mixture produced by supplying fuel to the burned gas is combusted in the following cylinders. When the engine is switched between the special operation mode and the normal operation mode, the control device selects transitional operation mode, in which the two-cylinder interconnect configuration is formed, and interrupts combustion in the preceding cylinders while producing combustion in the following cylinders by compression ignition.

12 Claims, 8 Drawing Sheets

CONTROL DEVICE FOR SPARK-IGNITION ENGINE

BACKGROUND OF THE INVENTION

1. Field of the Invention

The present invention relates to a multicylinder spark-ignition engine of which individual cylinders undergo successive combustion cycles with specific phase delays.

2. Description of the Related Art

There exist conventionally known approaches to improving fuel economy of a spark-ignition engine. One approach to fuel economy improvement is to burn a mixture at an air-fuel ratio higher than the stoichiometric air-fuel ratio in individual cylinders of a spark-ignition engine. An example of this approach is disclosed in Japanese Unexamined Patent Publication No. 1998-29836. The approach of the Publication employs fuel injectors for injecting fuel directly into combustion chambers to produce stratified charge combustion by injecting the fuel during a compression stroke when the engine is in a low-load, low-speed range, for instance, so that the mixture is burned under extremely lean conditions.

In this type of engine, it is impossible to sufficiently convert nitrogen oxides (NOx) under lean burn operating conditions by using as an emission-cleaning converter an ordinary three-way catalyst alone, which is a catalyst having high emission-cleaning performance to convert hydrocarbons (HC), carbon monoxide (CO) and NOx at about the stoichiometric air-fuel ratio. Therefore, as mentioned in Japanese Unexamined Patent Publication No. 1998-29836, the engine is provided with a lean NOx catalyst which adsorbs NOx in an oxygen-rich atmosphere and releases and reduces NOx in a decreased oxygen concentration atmosphere. If the amount of NOx adsorbed by the lean NOx catalyst has increased under the lean burn operating conditions when the lean NOx catalyst of this kind is being used, the fuel is injected not only for primary combustion but an additional amount of fuel is injected during an expansion stroke to lower the air-fuel ratio and generate CO for accelerating release and reduction of NOx as shown in the aforementioned Publication, for example.

In the aforementioned conventional engine which performs lean burn operation, it is necessary to provide an expensive lean NOx catalyst in an exhaust passage to realize high NOx-converting performance under the lean burn operating conditions. The provision of the lean NOx catalyst is disadvantageous from the viewpoint of product cost. Furthermore, it is necessary to temporarily lower the air-fuel ratio by supplying an additional amount of fuel to accelerate release and reduction of NOx when the amount of adsorbed NOx increases as stated above in order to maintain the converting performance of the lean NOx catalyst. Moreover, the lean NOx catalyst is susceptible to poisoning by sulfurization if the fuel used has a high sulfur content. The lean NOx catalyst should therefore be subjected to a regeneration treatment, such as heating of the catalyst and feeding of a reducing agent, to overcome this sulfur-poisoning problem of the lean NOx catalyst. All such problems of the conventional engine would jeopardize fuel economy improvement effects of the lean burn operation.

Another approach to fuel economy improvement is compression ignition which has been intensively studied in recent years. The compression ignition is spontaneous firing of a mixture in a combustion chamber occurring under high temperature and pressure conditions in a final part of a compression stroke as in a diesel engine. When the compression ignition is produced, the mixture rapidly burns throughout the entire combustion chamber even under conditions where the air-fuel ratio in the combustion chamber is extremely high or a large amount of burned gas is introduced into the combustion chamber by exhaust gas recirculation (EGR). This makes it possible to prevent too late combustion which does not produce any effective work. The compression ignition approach is therefore advantageous for improving the fuel economy.

In an ordinary spark-ignition engine, however, the temperature and pressure in the combustion chamber do not increase to such levels that are high enough to produce compression ignition at about a top dead center in the compression stroke. To produce compression ignition, it is necessary to make a special arrangement to considerably increase the temperature or the pressure in the combustion chamber. It has conventionally been difficult, however, to increase the temperature or the pressure in the combustion chamber to a level high enough to produce compression ignition in a part-load range in which the fuel economy must be improved while avoiding knocking (abnormal combustion caused by spontaneous firing of the mixture occurring before propagation of a flame in the combustion chamber) in a high-load range.

Under such circumstances, the Applicant previously filed Japanese Patent Application No. 2002-185242 for technology concerning a control device for a spark-ignition engine, which is intended to achieve a significant improvement in fuel economy by a combination of the lean burn operation and compression ignition. According to the claimed technology, a special operation mode is selected in a part-load range of the engine, in which a pair of preceding and following cylinders of which exhaust and intake strokes overlap is connected to form a two-cylinder interconnect configuration. When the two-cylinder interconnect configuration is established, burned gas discharged from the preceding cylinder which is currently in the exhaust stroke is introduced into the following cylinder which is currently in the intake stroke through an intercylinder gas channel, wherein a lean mixture having an air-fuel ratio higher than the stoichiometric air-fuel ratio is combusted by forced ignition in the preceding cylinder, whereas fuel is supplied to the burned gas having a high air-fuel ratio introduced from the preceding cylinder into the following cylinder so that a mixture thus produced in the following cylinder is combusted by compression ignition.

If the engine is controlled in the aforementioned special operation mode in the part-load range, a substantial fuel economy improvement effect is obtained in the preceding cylinder as a result of an improvement in thermal efficiency achieved by the lean burn operation and a reduction in pumping loss in the preceding cylinder. In the following cylinder, on the other hand, the mixture produced by supplying the fuel to the burned gas having a high air-fuel ratio introduced from the preceding cylinder is combusted. As the air-fuel ratio in the following cylinder is made equal to the stoichiometric air-fuel ratio in the special operation mode, pumping loss in the following cylinder is reduced and this produces a further fuel economy improvement effect.

In addition, since the high-temperature burned gas is introduced from the preceding cylinder into the following cylinder through the intercylinder gas channel, compression ignition occurs in a combustion chamber of the following cylinder after the temperature in the combustion chamber has increased up to a level high enough to produce compression ignition in the compression stroke. This serves to significantly improve the fuel economy and to decrease the amount of NOx emissions. Moreover, since the following cylinder discharges only such burned gas that is produced by burning the mixture at the stoichiometric air-fuel ratio, it is possible to realize satisfactory emission-cleaning performance with the three-way catalyst alone without the need for the provision of the lean NOx catalyst in an exhaust passage.

The spark-ignition engine of Japanese Patent Application No. 2002-185242 is made switchable depending on engine operating conditions between a normal operation mode in which combustion is produced independently in individual cylinders which are connected to form an independent cylinder configuration and the aforementioned special operation mode in which combustion is produced in the two-cylinder interconnect configuration with the burned gas discharged from the preceding cylinder introduced directly into the following cylinder. In this spark-ignition engine, a problem tends to occur in control operation for switching gas flow paths from the independent cylinder configuration to the two-cylinder interconnect configuration. The emission-cleaning performance of the engine could deteriorate during a transition period of this gas flow path switching operation. More particularly, it is so difficult to instantly alter and regulate the quantity of fresh intake air immediately following the gas flow path switching operation, and this poses a problem in controlling the air-fuel ratio which is the ratio of the quantity of fresh intake air to the quantity of fuel (gasoline). This makes it difficult to clean exhaust gases by using the three-way catalyst alone which has the high emission-cleaning performance at about the stoichiometric air-fuel ratio. Therefore, the emission-cleaning performance potentially deteriorate in the aforementioned spark-ignition engine.

SUMMARY OF THE INVENTION

In light of the foregoing, it is an object of the invention to provide such a control device for a spark-ignition engine that can properly switch the engine between a normal operation mode and a special operation mode while preventing deterioration of emission-cleaning performance during a transition period in which gas flow paths of the engine are switched.

The inventors of the present invention have intensively studied a phenomenon that the amount of NOx emissions can be decreased by combustion caused by compression ignition. Through this study, the inventors have reached an understanding that the temperature of fresh air introduced from preceding cylinders into following cylinders can be increased by interrupting combustion in the preceding cylinders and passing the fresh air through the preceding cylinders which retain a high-temperature atmosphere and, as a consequence, it becomes possible to produce compression ignition in the following cylinders and thereby prevent deterioration of emission-cleaning performance.

In one principal form of the invention, a control device for a four-cycle multicylinder spark-ignition engine of which individual cylinders go through successive combustion cycles with specific phase delays switches the engine according to operating conditions thereof between a normal operation mode and a special operation mode. When the engine is set to the normal operation mode, an independent cylinder configuration is formed so that combustion occurs independently in the individual cylinders with fresh air introduced thereinto. When the engine is set to the special operation mode in a part-load operating range, each pair of preceding and following cylinders of which exhaust and intake strokes overlap is connected to form a two-cylinder interconnect configuration so that burned gas discharged from the preceding cylinder which is currently in the exhaust stroke is introduced into the following cylinder which is currently in the intake stroke through an intercylinder gas channel and gas discharged from the following cylinder is led to an exhaust passage, a lean mixture having an air-fuel ratio higher than the stoichiometric air-fuel ratio is combusted in the preceding cylinder, and a mixture produced by supplying fuel to the burned gas having a high air-fuel ratio introduced from the preceding cylinder is combusted in the following cylinder. This control device has a capability to switch the engine between the normal operation mode and the special operation mode via a transitional operation mode in which gas flow paths are connected to form the two-cylinder interconnect configuration and the control device interrupts combustion in the preceding cylinders while producing combustion in the following cylinders by compression ignition.

In another principal form of the invention, a control device for a four-cycle multicylinder spark-ignition engine of which individual cylinders go through successive combustion cycles with specific phase delays switches the engine according to operating conditions thereof between a special operation mode and a normal operation mode. When the engine is set to the special operation mode in a part-load operating range, each pair of preceding and following cylinders of which exhaust and intake strokes overlap is connected to form a two-cylinder interconnect configuration so that burned gas discharged from the preceding cylinder which is currently in the exhaust stroke is introduced into the following cylinder which is currently in the intake stroke through an intercylinder gas channel and gas discharged from the following cylinder is led to an exhaust passage, a lean mixture having an air-fuel ratio higher than the stoichiometric air-fuel ratio is combusted in the preceding cylinder, and a mixture produced by supplying fuel to the burned gas having a high air-fuel ratio introduced from the preceding cylinder is combusted in the following cylinder. When the engine is set to the normal operation mode in an operating range on a higher-load side of the operating range in which the special operation mode is selected, an independent cylinder configuration is formed so that combustion occurs independently in the individual cylinders with fresh air introduced thereinto. This control device selects a transitional operation mode in which gas flow paths are connected to form the two-cylinder interconnect configuration and the control device interrupts combustion in the preceding cylinders while producing combustion in the following cylinders by compression ignition at least when the engine is switched from the special operation mode to the normal operation mode.

The aforementioned control devices of the invention control the engine to produce combustion in the special operation mode when the engine is in the part-load range. When the engine is controlled in the special operation mode in the part-load range, a substantial fuel economy improvement effect is obtained in the preceding cylinders as a result of an improvement in thermal efficiency achieved by the lean burn operation and a reduction in pumping loss in the preceding cylinders. In the following cylinders, on the other hand, the mixture produced by supplying fuel to the burned gas having a high air-fuel ratio introduced from the preceding cylinders is combusted, so that a fuel economy improvement effect is obtained due at least to a reduction in pumping loss in the following cylinders. In the special operation mode, the amount of NOx emissions from the preceding cylinders is kept to a relatively low level as the mixture having a significantly high air-fuel ratio is combusted in the preceding cylinders, whereas NOx emissions from the following cylinders are sufficiently suppressed as the burned gas is introduced from the preceding cylinders to create a condition equivalent to what would occur when a great deal of exhaust gas is introduced by EGR operation in the following cylinders. These features of the invention are advantageous for improving the quality of emissions.

When the engine is switched between the normal operation mode in which the gas flow paths are set to the independent cylinder configuration and the special operation mode in which the gas flow paths are set to the two-cylinder interconnect configuration, the control device temporarily selects the transitional operation mode in which the gas flow paths are set to the two-cylinder interconnect configuration. Specifically, the gas flow paths are switched to the two-cylinder interconnect configuration when the engine is switched from the normal operation mode to the special operation mode, whereas the gas flow paths are left in the two-cylinder interconnect configuration when the engine is switched from the special operation mode to the normal operation mode, and the control device interrupts combustion in the preceding cylinders in the transitional operation mode. In transitional operation mode, fresh air to be introduced into the following cylinders is heated in the preceding cylinders which retain a high-temperature atmosphere as combustion has been produced in the preceding cylinders until interrupted immediately before. Since the temperature of the fresh air is increased in this way, it becomes possible to produce compression ignition in the following cylinders. As the mixture in the following cylinders is combusted by the compression ignition in the transitional operation mode, NOx emissions from the following cylinders can be sufficiently suppressed during a period of operation mode transition. It is therefore possible to properly switch the engine between the normal operation mode and the special operation mode while preventing deterioration of the emission-cleaning performance regardless of the value of the air-fuel ratio of the mixture.

Moreover, since the control device produces combustion only in the following cylinders upon interrupting combustion in the preceding cylinders in the transitional operation mode, it is possible to combust the mixture by the compression ignition in a reliable fashion even in the period of operation mode transition during which the quantity of fresh intake air is unstable.

These and other objects, features and advantages of the invention will become more apparent upon reading the following detailed description along with the accompanying drawings.

DETAILED DESCRIPTION OF THE PREFERRED EMBODIMENTS OF THE INVENTION

Figure 1:
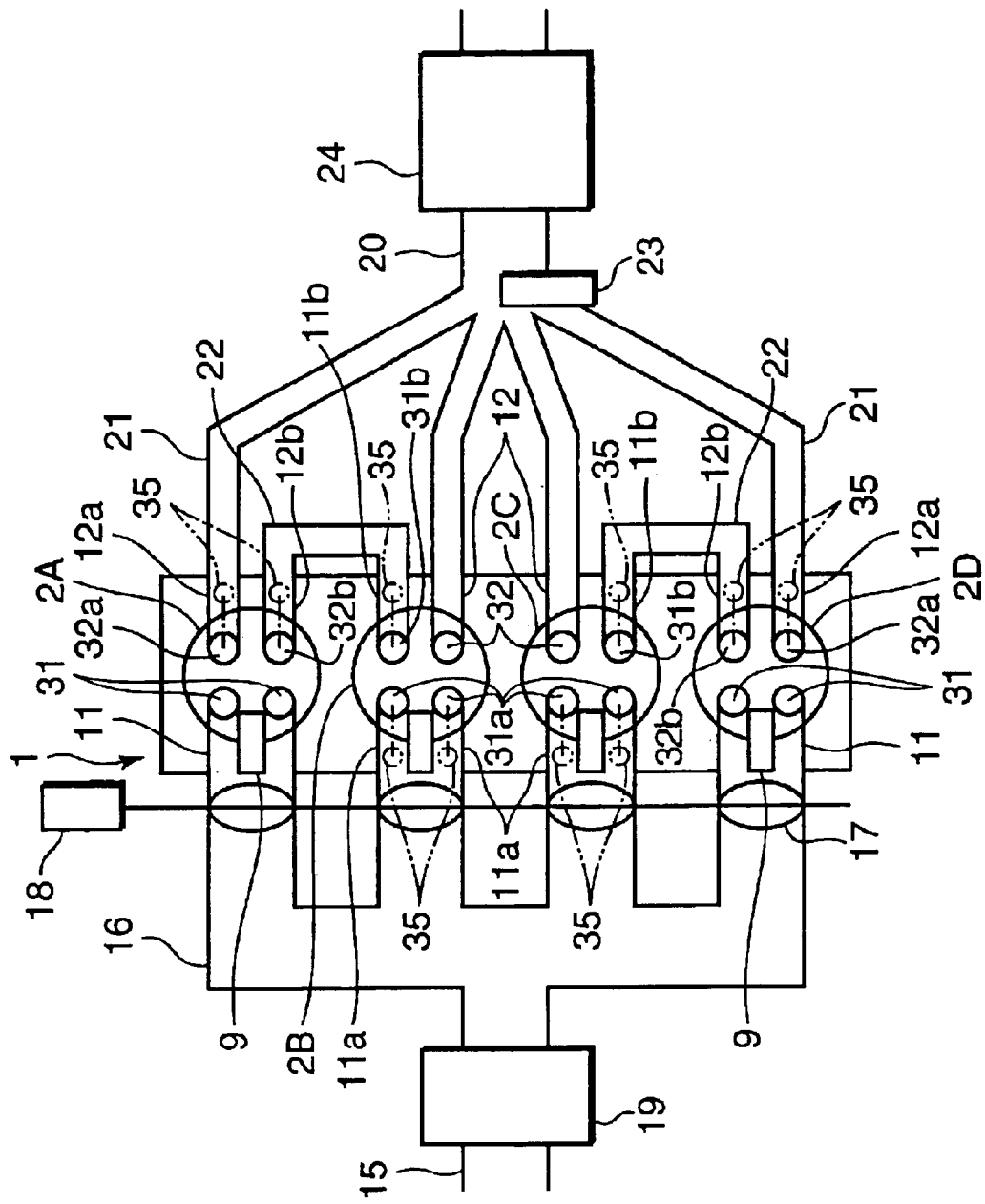
FIG. 1 is a schematic plan view of an entire engine provided with a control device according to a preferred embodiment of the invention.
Figure 2:
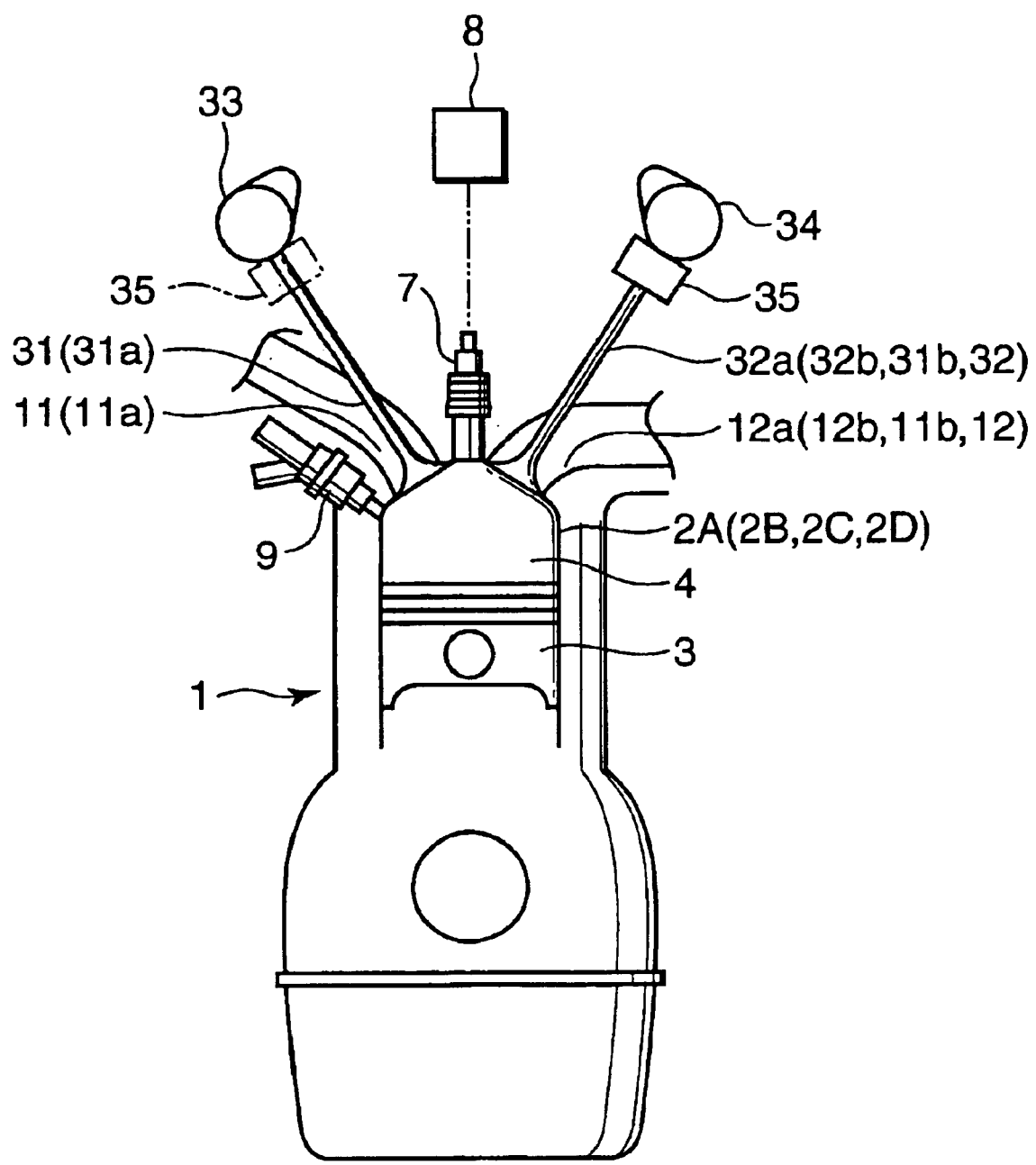
FIG. 2 is a schematic cross-sectional view of one of cylinders of an engine body shown together with associated components provided therein.

FIG. 1 is a diagram schematically showing the construction of a spark-ignition gasoline engine provided with a control device according to a preferred embodiment of the invention, and FIG. 2 is a diagram schematically showing the construction of one of cylinders of an engine body 1 together with such associated components as intake and exhaust valves provided in the cylinder.

Referring to these Figures, the engine body 1 has a plurality of cylinders. Specifically, the engine body 1 has four cylinders designated 2A, 2B, 2C and 2D in the illustrated embodiment. A piston 3 is fitted in each of these cylinders 2A–2D and a combustion chamber 4 is formed above the piston 3. There is installed a spark plug 7 at the top of the combustion chamber 4 in each cylinder 2 in such a way that a far end of the spark plug 7 is located inside the combustion chamber 4. The spark plug 7 is connected to an ignition circuit 8 which electronically controls ignition timing.

On one side of the combustion chamber 4 in each cylinder 2, there is provided a fuel injector 9 for injecting fuel directly into the combustion chamber 4. The fuel injector 9 incorporates a needle valve and a solenoid which are not illustrated. Actuated by a pulse signal output from a later-described fuel injection controller, the fuel injector 9 causes the needle valve to open for a period corresponding to the pulselength of the pulse signal so that a specific quantity of fuel determined by the valve open period would be injected from the fuel injector 9. Although not illustrated, the engine body 1 is provided with a fuel pump and a fuel-feeding passage. The fuel is supplied to each fuel injector 9 through a fuel-feeding system which is so constructed as to provide a fuel pressure higher than the internal pressure of each combustion chamber 4 in a compression stroke.

Intake ports 11, 11a, 11b and exhaust ports 12, 12a, 12b open into the combustion chambers 4 of the individual cylinders 2A–2D. An intake passage 15 and an exhaust passage 20 are connected to these ports 11, 11a, 11b, 12, 12a, 12b which are opened and closed by intake valves 31, 31a, 31b and exhaust valves 32, 32a, 32b, respectively.

Figure 5:
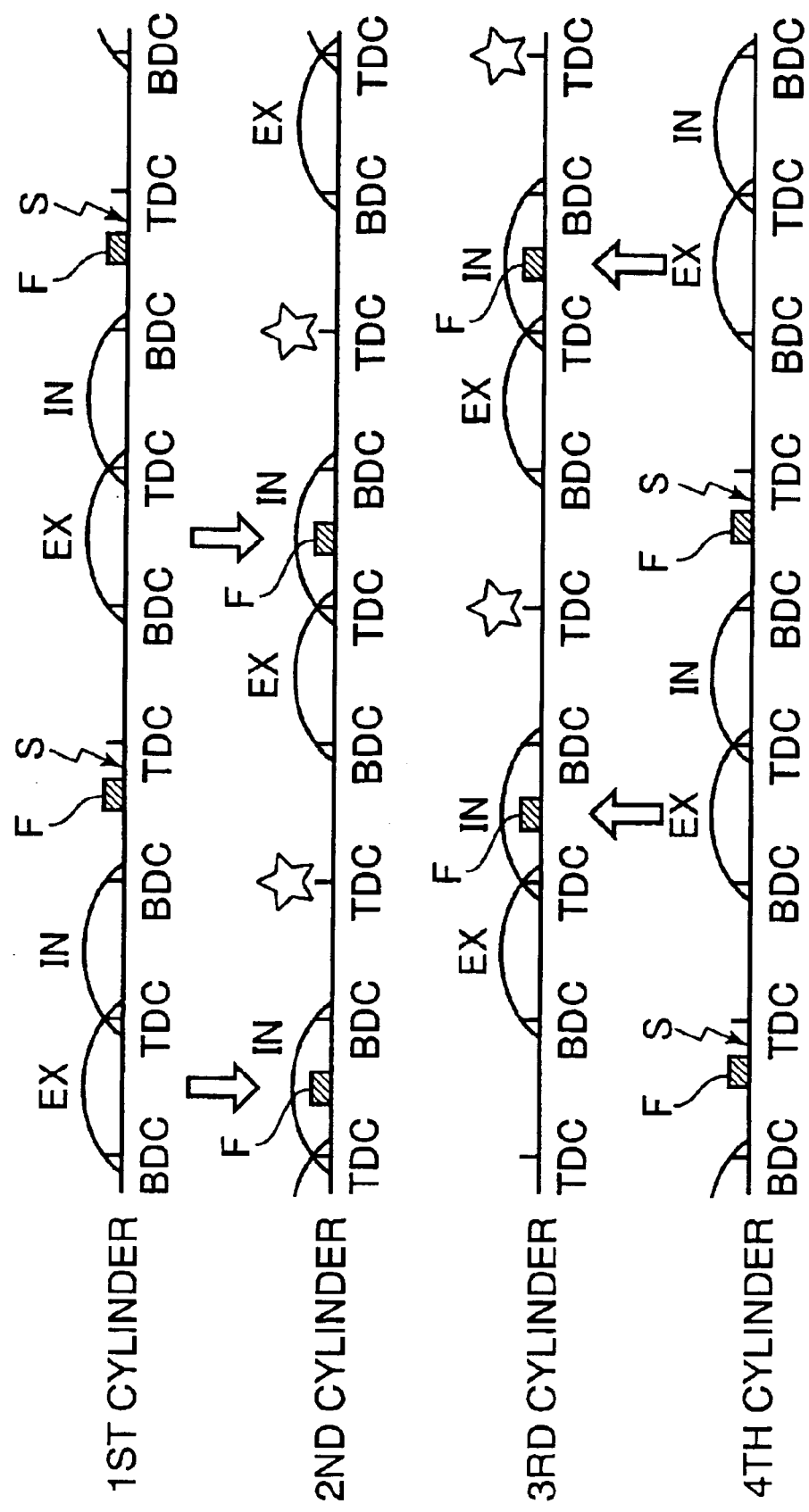
FIG. 5 is a diagram showing timing of exhaust and intake strokes as well as fuel injection timing and ignition timing of the individual cylinders.

The individual cylinders 2A–2D undergo successive combustion cycles of intake, compression, expansion and exhaust strokes with specific phase delays. In the four-cylinder engine of this embodiment of which cylinders 2A–2D are hereinafter referred to as the first cylinder 2A, the second cylinder 2B, the third cylinder 2C and the fourth cylinder 2D as viewed from one end of the cylinder bank, the aforementioned combustion cycles are carried out in the order of the first cylinder 2A, the third cylinder 2C, the fourth cylinder 2D and the second cylinder 2B with a successive phase delay of 180° in terms of crank angle as shown in FIG. 5. In FIG. 5, "EX" designates exhaust strokes, "IN" designates intake strokes. "F" designates fuel injection, "S" designates forced ignition, and each star-shaped symbol indicates a point where compression ignition is produced.

There is provided an intercylinder gas channel 22 between two cylinders of which exhaust and intake strokes overlap so that already burned gas can be led from the cylinder in the exhaust stroke (hereinafter referred to as the preceding cylinder in this Specification) to the cylinder in the intake stroke (hereinafter referred to as the following cylinder in this Specification) during a period of overlap of the exhaust and intake strokes. In the four-cylinder engine of this embodiment, the exhaust stroke (EX) of the first cylinder 2A overlaps the intake stroke (IN) of the second cylinder 2B and the exhaust stroke (EX) of the fourth cylinder 2D overlaps the intake stroke (IN) of the third cylinder 2C as shown in FIG. 5. Thus, the first cylinder 2A and the second cylinder 2B constitute one cylinder pair and the fourth cylinder 2D and the third cylinder 2C constitute another cylinder pair, the first and fourth cylinders 2A, 2D serving as the preceding cylinders and the second and third cylinders 2B, 2C serving as the following cylinders.

The intake and exhaust ports 11, 11a, 11b, 12, 12a, 12b of the individual cylinders 2A–2D, the intake and exhaust passages 15, 20 and the intercylinder gas channels 22 connected to the cylinders 2A–2D are configured as described in the following.

Specifically, the intake ports 11 for introducing fresh air, the first exhaust ports 12a for letting out burned gas (exhaust gas) into the exhaust passage 20 and the second exhaust ports 12b for delivering the burned gas to the following cylinders 2B, 2C are provided in the first cylinder 2A and the fourth cylinder 2D which are the preceding cylinders. In the second cylinder 2B and the third cylinder 2C which are the following cylinders, there are provided the first intake ports 11a for introducing fresh air, the second intake ports 11b for introducing the burned gas from the preceding cylinders 2A, 2D and the exhaust ports 12 for letting out the burned gas into the exhaust passage 20.

In the example shown in FIG. 1, two each intake ports 11 are provided in the first and fourth cylinders 2A, 2D and two each first intake ports 11a are provided in the second and third cylinders 2B, 2C in parallel arrangement on one side of the respective combustion chambers 4 as illustrated. Also, one each first exhaust port 12a and second exhaust port 12b are provided in the first and fourth cylinders 2A, 2D and one each second intake port 11b and exhaust port 12 are provided in the second and third cylinders 2B, 2C in parallel arrangement on the opposite side of the respective combustion chambers 4 as illustrated.

Downstream ends of intake channels 16 branched out from the common intake passage 15 are connected to the intake ports 11 of the first and fourth cylinders (preceding cylinders) 2A, 2D and to the first intake ports 11a of the second and third cylinders (following cylinders) 2B, 2C. Close to the downstream ends of the individual branched intake channels 16, there are provided multiple throttle valves 17 which are operated in an interlocked fashion by a common shaft. The multiple throttle valves 17 are driven by an actuator 18 according to a control signal to regulate the quantity of intake air. An airflow sensor 19 for detecting the quantity of intake air is provided in; the common intake passage 15 upstream of a joint part of the branched intake channels 16.

Upstream ends of exhaust channels 21 branched from the exhaust passage 20 are connected to the first exhaust ports 12a of the first and fourth cylinders (preceding cylinders) 2A, 2D and to the exhaust ports 12 of the second and third cylinders (following cylinders) 2B, 2C. The intercylinder gas channels 22 are provided between the first cylinder 2A and the second cylinder 2B and between the third cylinder 2C and the fourth cylinder 2D. Upstream ends of the intercylinder gas channels 22 are connected to the second exhaust ports 12b of the first and fourth cylinders (preceding cylinders) 2A, 2D while downstream ends of the intercylinder gas channels 22 are connected to the second intake ports 11b of the second and third cylinders (following cylinders) 2B, 2C.

The intercylinder gas channels 22 are relatively short gas-carrying channels interconnecting the adjacent cylinders. Therefore, the amount of heat dissipated from the burned gas discharged from the preceding cylinders 2A, 2D and led into the following cylinders 2B, 2C through the intercylinder gas channels 22 is kept to a relatively low level.

An O2 sensor 23 for determining the air-fuel ratio by detecting the concentration of oxygen in the exhaust gas is disposed at a joint part where the branched exhaust channels 21 join into the common exhaust passage 20, downstream of the individual branched exhaust channels 21. A three-way catalyst 24 is disposed in the exhaust passage 20 further downstream of the O2 sensor 23. As is commonly known, the three-way catalyst 24 is a catalyst which exhibits high converting performance with respect to HC, CO and NOx when the air-fuel ratio of the exhaust gas is approximately equal to the stoichiometric air-fuel ratio (i.e., excess-air factor $\lambda=1$).

The intake and exhaust valves 31, 31a, 31b, 32, 32a, 32b for opening and closing the aforementioned intake and exhaust ports 11, 11a, 11b, 12, 12a, 12b of the individual cylinders 2A–2D and valve actuating mechanisms for controlling the intake and exhaust valves 31, 31a, 31b, 32, 32a, 32b are constructed as follows.

The intake ports 11, the first exhaust ports 12a and the second exhaust ports 12b of the preceding cylinders 2A, 2D are provided with the intake valves 31, the first exhaust valves 32a and the second exhaust valves 32b, respectively. Similarly, the first intake ports 11a, the second intake ports 11b and the exhaust ports 12 of the following cylinders 2B, 2C are provided with the first intake valves 31a, the second intake valves 31b and the exhaust valves 32, respectively. The valve actuating mechanisms including respective camshafts 33, 34 drive these intake and exhaust valves 31, 31a, 31b, 32, 32a, 32b to open and close them at specific timing such that the exhaust and intake strokes of the individual cylinders 2A–2D are performed with the earlier-mentioned specific phase delays.

Among the aforementioned intake and exhaust valves 31, 31a, 31b, 32, 32a, 32b, the first exhaust valves 32a, the second exhaust valves 32b, the first intake valves 31a and the second intake valves 31b are individually provided with valve stop mechanisms 35 for switching the respective valves 31a, 31b, 32a, 32b between activated and deactivated states. The construction of these valve stop mechanisms 35 is not illustrated in detail as the same is conventional. As an example, the valve stop mechanisms 35 are provided on the camshafts 33, 34, in which a tappet disposed between a cam and a valve stem is provided with a hydraulic chamber to and from which hydraulic oil can be supplied and withdrawn. When the hydraulic oil is supplied to the hydraulic chamber, the motion of the cam is transmitted to the relevant valve so that the valve is caused to open and close. When the hydraulic oil is withdrawn from the hydraulic chamber, the motion of the cam is not transmitted to the relevant valve so that the valve becomes immovable.

Figure 3:
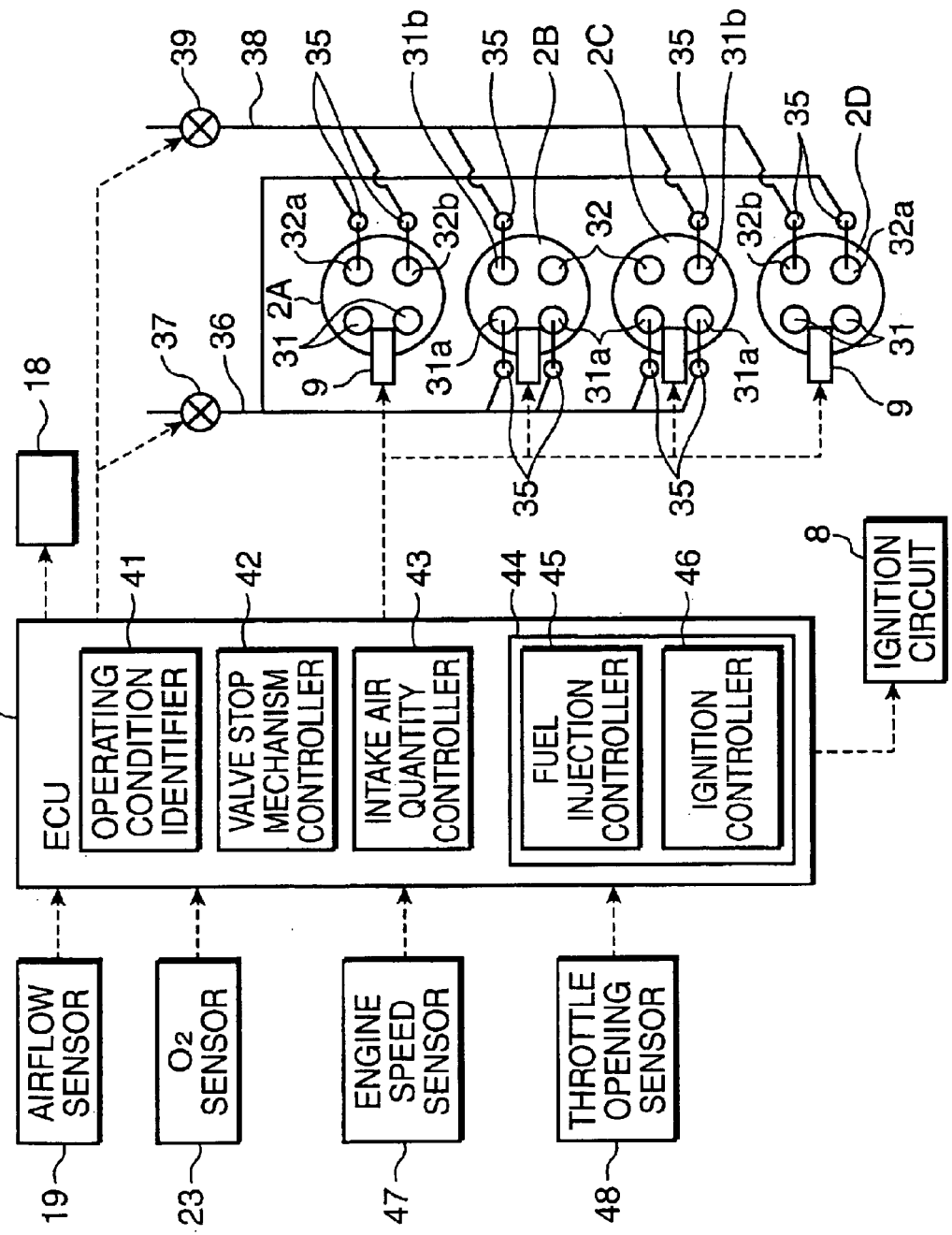
FIG. 3 is a block diagram of a control system of the engine of the embodiment.

Referring to FIG. 3, there is provided a first control valve 37 in a fluid channel 36 for supplying and withdrawing the hydraulic oil to and from the valve stop mechanisms 35 of the first exhaust valves 32a and the first intake valves 31a, while there is provided a second control valve 39 in a fluid channel 38 for supplying and withdrawing the hydraulic oil to and from the valve stop mechanisms 35 of the second exhaust valves 32b and the second intake valves 31b.

FIG. 3 shows the configuration of a drive/control system of the engine of the embodiment. Referring to this Figure, signals output from the airflow sensor 19 and the O2 sensor 23 are input into an ECU (electronic control unit) 40 which includes a microcomputer for controlling the engine. Also input into the ECU 40 are signals output from an engine speed sensor 47 for detecting engine speed used for judging operating condition of the engine and a throttle opening sensor 48 for detecting throttle opening which corresponds to the amount of depression of an accelerator. On the other hand, the ECU 40 outputs control signals to the individual fuel injectors 9, the actuator 18 of the multiple throttle valves 17 as well as to the first and second control valves 37, 39.

The ECU 40 includes an operating condition identifier 41, a valve stop mechanism controller 42, an intake air quantity controller 43 and a combustion condition controller 44. As will be described later in detail, the ECU 40 controls the engine in a special operation mode when the engine is in a part-load range on a low-load, low-speed side and controls the engine in a normal operation mode at least in an operating range in which the engine load or engine speed is higher than in the part-load range. What is characteristic of the present embodiment is that the ECU 40 controls the engine in a later-described transitional operation mode when the engine is switched between the special operation mode selected in the part-load range and the normal operation mode selected in the higher-load, higher-speed operating range.

Figure 4:
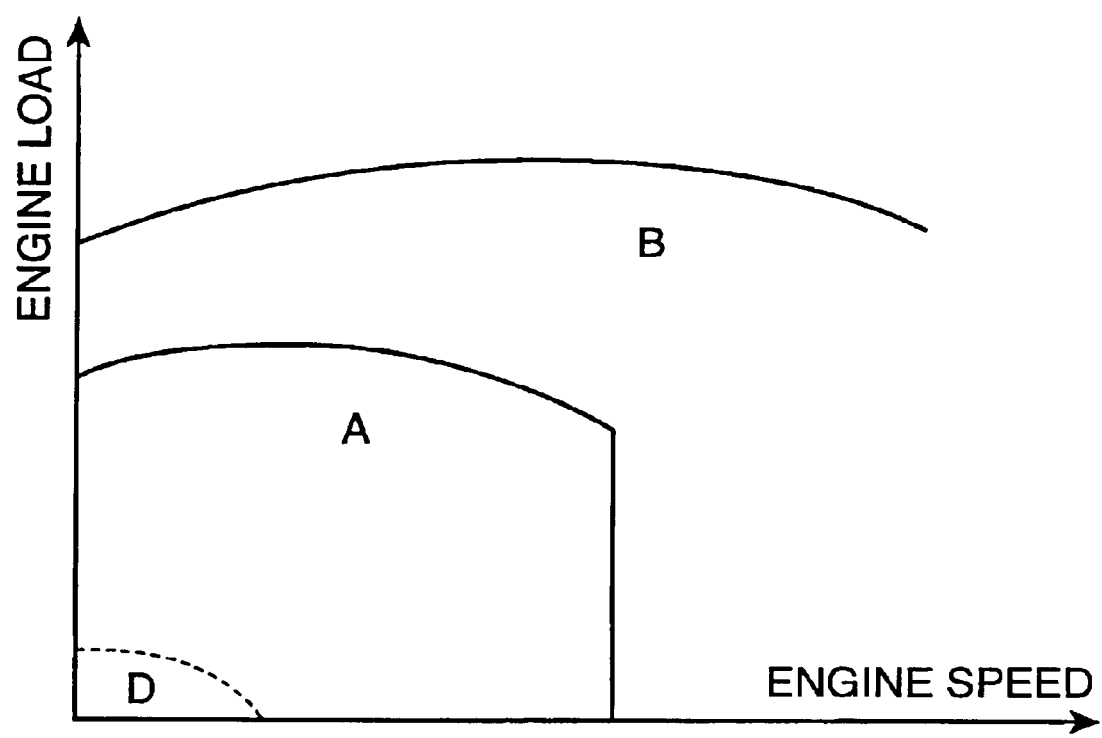
FIG. 4 is an explanatory diagram showing an example of operating ranges set for properly controlling the engine according to operating conditions thereof.

Having a map used for engine control as shown in FIG. 4, in which the letter "A" represents an engine operating range on a low-load, low-speed side (part-load range) and the letter "B" represents an engine operating range on a high-load, high-speed side, the operating condition identifier 41 examines the operating condition of the engine (engine speed and load) based on the signals fed from the engine speed sensor 47 and the throttle opening sensor 48 and judges whether the engine operating condition falls in the aforementioned operating range A or B. When the engine is judged to be currently in the low-load, low-speed operating range A, the operating condition identifier 41 selects the special operation mode in which the burned gas discharged from the preceding cylinder 2A (2D) in the exhaust stroke thereof is introduced into the following cylinder 2B (2C) in the intake stroke thereof and used for combustion in the following cylinder 2B (2C). When the engine is judged to be currently in the high-load, high-speed operating range B, on the other hand, the operating condition identifier 41 selects the normal operation mode in which combustion is produced independently in the individual cylinders 2A–2D. At transition from the operating range A to the operating range B, and from the operating range B to the operating range A, the operating condition identifier 41 connects gas flow paths to form a dual two-cylinder interconnect configuration and selects the transitional operation mode, in which no combustion occurs in the preceding cylinders 2A, 2D whereas combustion is produced by compression ignition in the following cylinders 2B, 2C.

The valve stop mechanism controller 42 controls the individual valve stop mechanisms 35 to alter intake and exhaust gas flows in such a way that the aforementioned dual two-cylinder interconnect configuration is established in the special operation mode and an independent cylinder configuration is established in the normal operation mode. Specifically, the valve stop mechanism controller 42 controls the valve stop mechanisms 35 to establish the dual two-cylinder interconnect configuration in the special operation mode such that the burned gas discharged from the preceding cylinders 2A, 2D is introduced into the following cylinders 2B, 2C through the intercylinder gas channels 22 and to establish the independent cylinder configuration in the normal operation mode such that fresh air is introduced into the individual cylinders 2A–2D. More specifically, the valve stop mechanism controller 42 controls the valve stop mechanisms 35 such that the intake and exhaust valves 31a, 31b, 32a, 32b are set as follows by controlling supply and withdrawal of the hydraulic oil through the aforementioned first and second control valves 37, 39 depending on whether the engine operating condition falls in the operating range A or in the operating range B.

Operating range A: The first exhaust valves 32a and the first intake valves 31a are set to the deactivated state while the second exhaust valves 32b and the second intake valves 31b are set to the activated state.

Operating range B: The first exhaust valves 32a and the first intake valves 31a are set to the activated state while the second exhaust valves 32b and the second intake valves 31b are set to the deactivated state.

The gas flow paths are switched such that the engine is switched from the independent cylinder configuration for the normal operation mode to the dual two-cylinder interconnect configuration for the special operation mode by properly controlling supply and withdrawal of the hydraulic oil to and from the valve stop mechanisms 35 by means of the control valves 37, 39. The switching of the gas flow paths performed when the engine is switched from the high-load, high-speed operating range B to the low-load, low-speed operating range A is not simply a time-reversed process of the switching of the gas flow paths performed when the engine is switched from the part-load range A to the operating range B. The engine is switched between the operating ranges A and B via the transitional operation mode in which the dual two-cylinder interconnect configuration is used. Thus, when the engine transfers from the part-load range A to the operating range B, the gas flow paths are not instantly switched from the dual two-cylinder interconnect configuration to the independent cylinder configuration at the moment of transfer to the operating range B. In this case, the engine is controlled in the transitional operation mode for a predefined period of time from the point of transfer to the operating range B before the gas flow paths are finally switched to the independent cylinder configuration. When the engine transfers from the operating range B to the part-load range A, on the other hand, the gas flow paths are instantly switched from the independent cylinder configuration to the dual two-cylinder interconnect configuration at the moment of transfer to the part-load range A and the engine is run in the transitional operation mode for a specific period of time.

The intake air quantity controller 43 regulates the opening of each throttle valve 17 (throttle opening) by controlling the actuator 18. The intake air quantity controller 43 determines a target intake air quantity with reference to a map, for example, based on the engine operating condition and regulates the throttle opening of each throttle valve 17 according to the target intake air quantity obtained. In the part-load range A in which the engine is operated in the special operation mode, introduction of fresh air into the following cylinders 2B, 2C through the branched intake channels 16 is interrupted and combustion in the following cylinders 2B, 2C is produced with the ratio of the quantity of excess air contained in the gas introduced from the preceding cylinders 2A, 2D to the quantity of newly supplied fuel set to a value corresponding to the stoichiometric air-fuel ratio. Therefore, the throttle opening is regulated in such a manner that fresh air is supplied to the preceding cylinders 2A, 2D in such quantities that are necessary for burning the fuel in a quantity corresponding to the amount of torque to be produced by each pair of preceding and following cylinders (or in such quantities that would produce the stoichiometric air-fuel ratio with the quantity of fuel supplied to each pair of preceding and following cylinders).

When the engine operation mode selected by the operating condition identifier 41 is switched, that is, when the engine is switched from the special operation mode to the normal operation mode, or vice versa, the target intake air quantity is greatly varied. Therefore, even if the intake air quantity controller 43 performs the aforementioned control operation for regulating the throttle opening of each throttle valve 17, a specific time period is needed for the actual quantity of intake air to reach the target intake air quantity. Accordingly, there inevitably occurs some delay in response during a period of transition between the two operation modes. For this reason, even if the throttle opening of each throttle valve 17 is regulated to supply fresh air in such quantities that would produce the stoichiometric air-fuel ratio with the quantity of fuel predetermined according to the amount of torque to be produced by each cylinder, the exhaust gas may become extremely lean or rich during the transition period. Should this situation occur, it would not be possible to sufficiently convert NOx, resulting in deterioration of emission-cleaning performance.

To overcome this problem, the control device of the present embodiment is constructed such that the operating condition identifier 41 selects the transitional operation mode during the aforementioned transition period. In the transitional operation mode, the control device causes combustion to occur only in the following cylinders 2B, 2C by compression ignition which serves to decrease the amount of NOx emissions while adjusting the quantity of injected fuel predetermined according to the amount of torque to be produced by each cylinder such that a lean mixture having a high air-fuel ratio is produced in the following cylinders 2B, 2C. In this way, the control device of the embodiment prevents deterioration of the emission-cleaning performance.

Generally, a special arrangement for increasing temperature or pressure in the combustion chambers 4 must be made to produce compression ignition therein. In the control device of the present embodiment, the valve stop mechanism controller 42 forms the dual two-cylinder interconnect configuration and the later-described combustion condition controller 44 interrupts combustion in the preceding cylinders 2A, 2D in the transitional operation mode. As a result, the temperature of fresh air introduced into the following cylinders 2B, 2C (through the preceding cylinders 2A, 2D) increases to such a level that is high enough to produce compression ignition in the following cylinders 2B, 2C.

The combustion condition controller 44 includes a fuel injection controller 45 and an ignition controller 46. The fuel injection controller 45 controls the quantities of fuel to be injected from the fuel injectors 9 provided in the individual cylinders 2A–2D, including whether to inject the fuel, and sets injection timing according to the engine operating condition. The ignition controller 46 controls ignition timing and determines whether to stop ignition according to the engine operating condition. Depending particularly on whether the engine is in the operating range A or the operating range B, the combustion condition controller 44 differently controls combustion conditions (fuel injection and ignition).

Specifically, when the engine is in the part-load range A on the low-load, low-speed side, the engine is set to the special operation mode. In the special operation mode, the fuel injection controller 45 controls the quantities of fuel injected into the preceding cylinders 2A, 2D such that a mixture having an air-fuel ratio higher than the stoichiometric air-fuel ratio is produced in the preceding cylinders 2A, 2D and sets the injection timing to inject the fuel in the compression stroke such that the mixture produced in the preceding cylinders 2A, 2D is stratified, while the ignition controller 46 sets the ignition timing in such a way that the mixture in the preceding cylinders 2A, 2D is fired by forced ignition at about a top dead center in the compression stroke. In this case (when the engine is in the part-load range A), the fuel injection controller 45 controls the quantities of fuel injected into the following cylinders 2B, 2C such that a mixture having an air-fuel ratio substantially equal to the stoichiometric air-fuel ratio is produced in the following cylinders 2B, 2C by supplying the fuel to the burned gas having a high air-fuel ratio introduced from the preceding cylinders 2A, 2D and sets the injection timing to inject the fuel in the intake stroke, and the ignition controller 46 stops forced ignition so that the mixture in the following cylinders 2B, 2C is fired by compression ignition.

When the engine is in the operating range B on the high-load, high-speed side, on the other hand, the engine is set to the normal operation mode. In the normal operation mode, the fuel injection controller 45 controls the quantities of fuel injected into the individual cylinders 2A–2D such that a mixture having an air-fuel ratio equal to or lower than the stoichiometric air-fuel ratio is produced. For example, the air-fuel ratio is made equal to the stoichiometric air-fuel ratio in most regions of the operating range B and made lower than the stoichiometric air-fuel ratio to produce a rich mixture in and near a full-throttle load region. In this engine operating condition, the fuel injection controller 45 sets the injection timing to inject the fuel in the intake stroke such that the mixture produced in the individual cylinders 2A–2D is homogenized and the ignition controller 46 controls the engine to produce forced ignition in the individual cylinders 2A–2D.

As mentioned in the foregoing discussion, the gas flow paths are left in the dual two-cylinder interconnect configuration for a while when the engine is switched from the part-load range A (special operation mode) to the operating range B (normal operation mode), whereas the gas flow paths are instantly switched from the independent cylinder configuration to the dual two-cylinder interconnect configuration when the engine is switched from the operating range B (normal operation mode) to the part-load range A (special operation mode). When switched from the part-load range A to the operating range B, or vice versa, the engine is temporarily set to the transitional operation mode with the gas flow paths left in or switched to the dual two-cylinder interconnect configuration. In the transitional operation mode, the fuel injection controller 45 interrupts fuel injection into the preceding cylinders 2A, 2D and controls the quantities of fuel injected into the following cylinders 2B, 2C such that a mixture having an air-fuel ratio equal to or slightly higher than the stoichiometric air-fuel ratio is produced in the following cylinders 2B, 2C, while the ignition controller 46 stops forced ignition. Consequently, combustion occurs only in the following cylinders 2B, 2C by compression ignition in the transitional operation mode. This transitional operation mode is carried out for a specific time period which could be as long as one to two combustion cycles, for example. According to the invention, the aforementioned specific time period during which the transitional operation mode is carried out is not necessarily predetermined in this way. For example, the transitional operation mode may be carried out until the total quantity of intake air detected by the airflow sensor 19 reaches a value corresponding correctly to the opening of the multiple throttle valves 17.

The working of the control device of the present embodiment is now described with reference to FIGS. 5–8.

Figure 6:
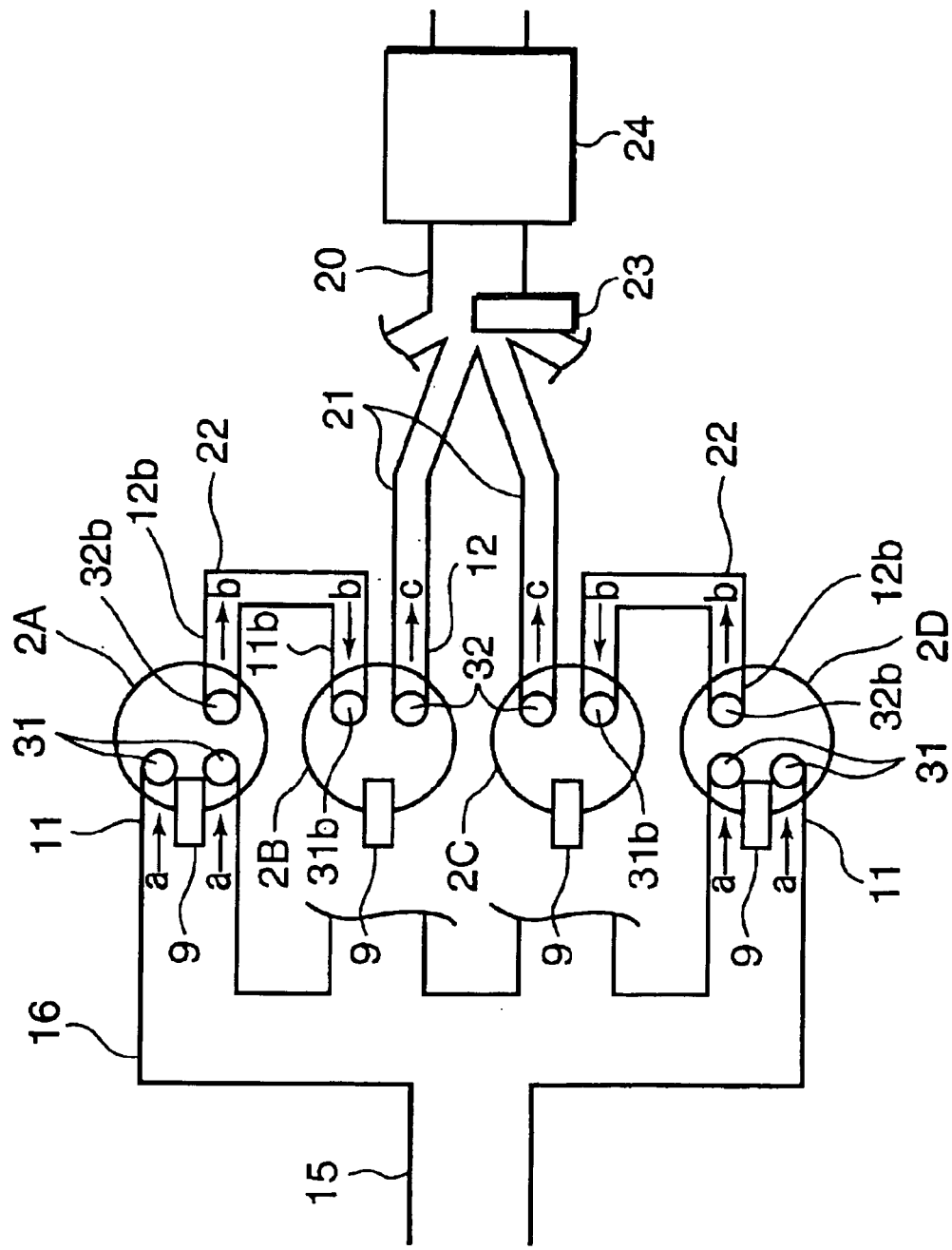
FIG. 6 is an explanatory diagram showing substantial fresh air and gas flow paths formed in a low-load, low-speed operating range.

In the part-load range A on the low-load, low-speed side, the engine is controlled in the special operation mode by an operation mode controller including the valve stop mechanism controller 42 and the intake air quantity controller 43 with the first exhaust valves 32a and the first intake valves 31a set to the deactivated state and the second exhaust valves 32b and the second intake valves 31b set to the activated state. In this condition, substantial fresh air and gas flow paths as shown in FIG. 6 are formed. As a result, there is established the dual two-cylinder interconnect configuration in which the burned gas discharged from the preceding cylinders (first and fourth cylinders) 2A, 2D is introduced directly into the respective following cylinders (second and third cylinders) 2B, 2C through the intercylinder gas channels 22 (arrows "b" in FIG. 6) and the burned gas discharged from only the following cylinders 2B, 2C is led to the exhaust passage 20 (arrows "c" in FIG. 6).

When the dual two-cylinder interconnect configuration is used in the special operation mode, fresh air is introduced through the intake passage 15 (arrows "a" in FIG. 6) into the preceding cylinders 2A, 2D in the intake stroke thereof, the fuel is injected into the preceding cylinders 2A, 2D in the compression stroke thereof with the quantities of injected fuel controlled such that the air-fuel ratio in the preceding cylinders 2A, 2D becomes higher than the stoichiometric air-fuel ratio, e.g., approximately equal to twice stoichiometric air-fuel ratio, and a lean mixture having a high air-fuel ratio thus produced is ignited at specific ignition points to produce stratified charge combustion in the preceding cylinders 2A, 2D (refer to FIG. 5).

Subsequently, the burned gas discharged from the preceding cylinders 2A, 2D is introduced into the respective following cylinders 2B, 2C through the intercylinder gas channels 22 during periods when the exhaust stroke of the preceding cylinders 2A, 2D overlaps the intake stroke of the following cylinders 2B, 2C (open arrows in FIG. 5 and arrows "b" in FIG. 6). The fuel is injected into the following cylinders 2B, 2C during the intake stroke thereof with the quantities of fuel controlled in such a way that the air-fuel ratio in the following cylinders 2B, 2C becomes equal to the stoichiometric air-fuel ratio as the fuel is supplied to the burned gas having a high air-fuel ratio introduced from the preceding cylinders 2A, 2D. Then, the compression ignition is produced in the following cylinders 2B, 2C as the pressure and temperature in the combustion chambers 4 thereof increase near the top dead center in the compression stroke.

When the engine is operated in the special operation mode as discussed above, the high-temperature burned gas discharged from the preceding cylinders 2A, 2D is introduced directly into the respective following cylinders 2B, 2C through the intercylinder gas channels 22, so that the temperature in the combustion chambers 4 of the following cylinders 2B, 2C increases in the intake stroke. As the temperature and pressure in the following cylinders 2B, 2C further increase in the compression stroke, the temperature of the mixture in the combustion chambers 4 of the following cylinders 2B, 2C increases to such a level that is high enough to produce compression ignition at about the top dead center in a final part of the compression stroke. Furthermore, the burned gas is sufficiently mixed and becomes homogeneous during a period when the burned gas discharged from the preceding cylinders 2A, 2D is introduced into the respective following cylinders 2B, 2C. Moreover, since the fuel injected into the following cylinders 2B, 2C during the intake stroke thereof is homogeneously distributed in the entire combustion chambers 4 of the following cylinders 2B, 2C prior to the final part of the compression stroke, there is obtained such a homogeneously dispersed mixture in the following cylinders 2B, 2C that would satisfy conditions for producing ideal simultaneous compression ignition at multiple points in each combustion chamber 4. The homogeneous mixture thus produced in the following cylinders 2B, 2C is rapidly combusted by simultaneous multi-point compression ignition, contributing thereby to a significant improvement in thermal efficiency.

As shown in the above discussion, stratified charge combustion is produced in the preceding cylinders 2A, 2D by burning the lean mixture in the special operation mode so that the thermal efficiency is improved. Also, compared to an ordinary engine in which the stratified charge combustion is not produced, the value of negative intake pressure is decreased in the engine of the embodiment and this results in a reduction in pumping loss. In the following cylinders 2B, 2C, compression ignition is produced by burning the homogeneous mixture in the special operation mode so that the thermal efficiency is improved. In addition, since the burned gas forced out of the preceding cylinders 2A, 2D is led into the following cylinders 2B, 2C, the pumping loss in the following cylinders 2B, 2C is more reduced than in the preceding cylinders 2A, 2D. A significant improvement in fuel economy is achieved by the control device of the embodiment as a result of a combination of the aforementioned advantageous features thereof.

In the preceding cylinders 2A, 2D, the amount of NOx emissions is decreased to a relatively low level as the air-fuel ratio is made equal to or approximately equal to twice the stoichiometric air-fuel ratio. In the following cylinders 2B, 2C, the amount of NOx emissions is sufficiently decreased. This is because the burned gas is introduced from the preceding cylinders 2A, 2D to create a condition equivalent to what would occur when a great deal of exhaust gas is introduced by EGR operation in the following cylinders 2B, 2C and because rapid combustion caused by the aforementioned simultaneous multi-point compression ignition serves to prevent reaction between oxygen and nitrogen in a best possible manner. The aforementioned arrangement of the embodiment is advantageous for improving the quality of emissions from such a point of view as well. Since the compression ignition in the following cylinders 2B, 2C is produced by using heat of the burned gas introduced from the preceding cylinders 2A, 2D, it is possible to easily cause the compression ignition without the need for a dedicated heating device or any special arrangement for achieving an extremely high compression ratio.

The control device of the embodiment is so constructed as to control the air-fuel ratio in the following cylinders 2B, 2C in such a manner that the concentration of oxygen in the exhaust gas discharged from the following cylinders 2B, 2C would become equal to a value corresponding to a combustion state at the stoichiometric air-fuel ratio at least in the part-load range A in which the compression ignition is produced. Thus, it is possible to discharge only the burned gas produced by combustion at the stoichiometric air-fuel ratio in the following cylinders 2B, 2C into the exhaust passage 20 while combusting the lean mixture in the preceding cylinders 2A, 2D. For this reason, it is possible in the special operation mode to realize sufficient emission-cleaning performance with the three-way catalyst 24 alone without the need for the provision of a lean NOx catalyst unlike conventional lean burn engines. As it is not necessary to provide the lean NOx catalyst as stated above, there is no need to temporarily lower the air-fuel ratio for accelerating release and reduction of NOx when the amount of NOx adsorbed by the lean NOx catalyst has increased, whereby a decrease in fuel economy improvement effect can be avoided. Moreover, the arrangement of the embodiment does not cause the earlier-mentioned problem of poisoning of the lean NOx catalyst by sulfurization.

Figure 7:
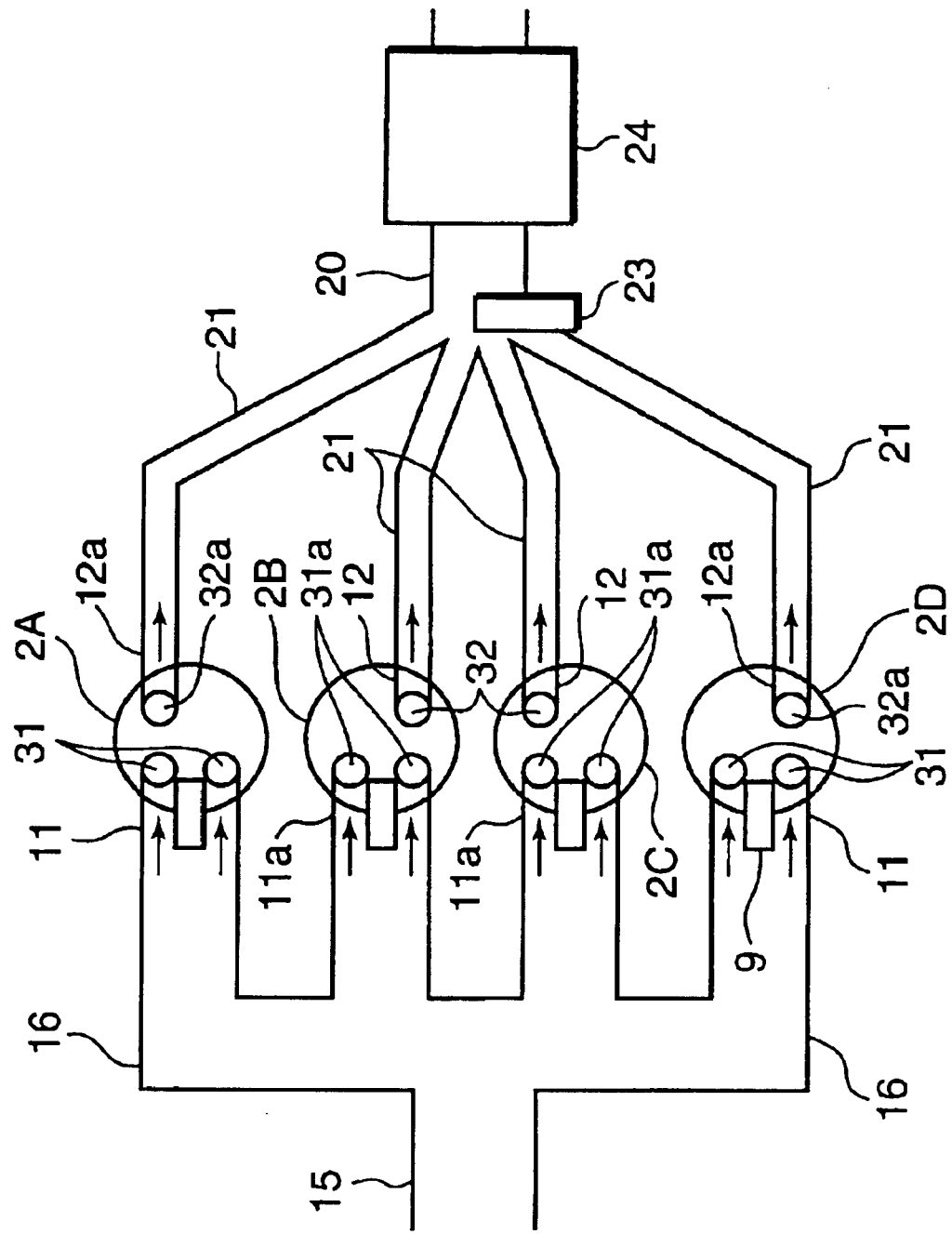
FIG. 7 is an explanatory diagram showing substantial fresh air and gas flow paths formed in a high-load, high-speed operating range.

In the operating range B on the high-load, high-speed side, on the other hand, the engine is set to the normal operation mode with the first exhaust valves 32a and the first intake valves 31a set to the activated state and the second exhaust valves 32b and the second intake valves 31b set to the deactivated state. In this condition, substantial fresh air and gas flow paths as shown in FIG. 7 are formed. As a result, there is established the independent cylinder configuration in which the intake ports 11, 11a and the exhaust ports 12, 12a of the individual cylinders 2A–2D work independently of one another. When the independent cylinder configuration is used in the normal operation mode, fresh air is introduced through the intake passage 15 and the intake ports 11, 11a into the respective cylinders 2A–2D and the burned gas is discharged from the cylinders 2A–2D into the exhaust passage 20 through the respective exhaust ports 12, 12a. In this operating range B, the total quantity of intake air and the quantities of injected fuel are so controlled that the air-fuel ratio in the individual cylinders 2A–2D becomes equal to or smaller than the stoichiometric air-fuel ratio to produce a rich mixture to ensure sufficient engine output performance.

When the engine has transferred from the part-load range A to the operating range B on the high-load, high-speed side, the control device of the embodiment controls the engine in the transitional operation mode.
Specifically, with the gas flow paths left in the dual two-cylinder interconnect configuration, the control device interrupts combustion in the preceding cylinders 2A, 2D while causing combustion to continuously occur only in the following cylinders 2B, 2C by compression ignition. After controlling the engine in the transitional operation mode for a specific period of time, the control device switches the gas flow paths from the dual two-cylinder interconnect configuration to the independent cylinder configuration to control the engine in the normal operation mode in which combustion is produced in the individual cylinders 2A–2D in the earlier-mentioned predefined order.

Figure 8A:
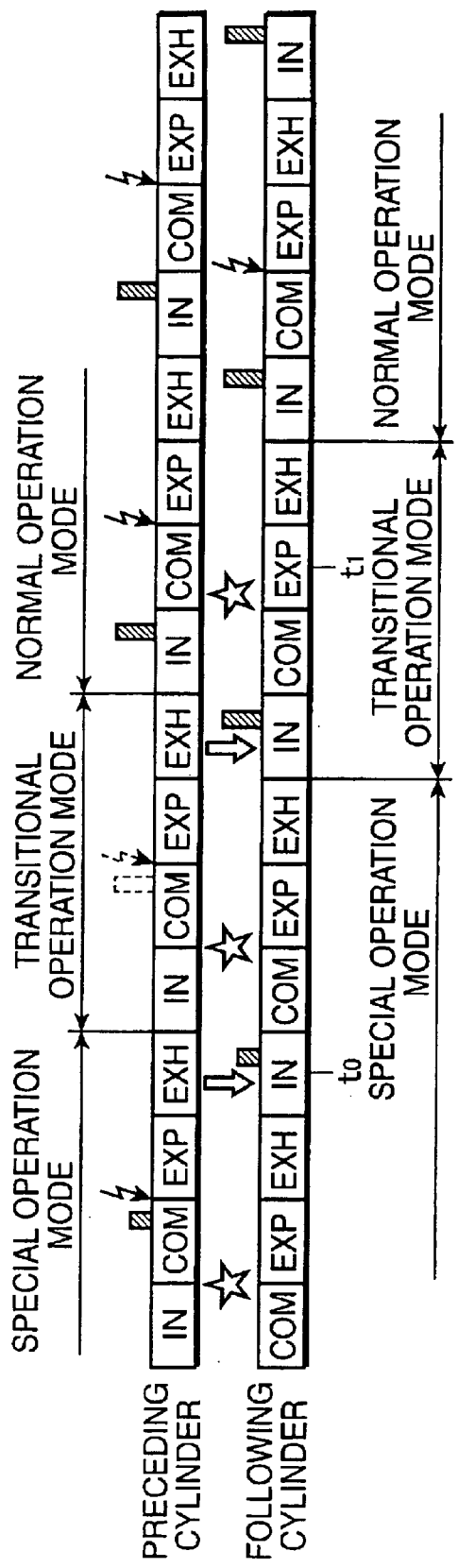
FIGS. 8A and 8B are time charts showing timing of successive combustion cycles performed when the engine is switched from a normal operation mode to a special operation mode, and vice versa, via a transitional operation mode.

FIG. 8A shows an exemplary situation where the control device detects that the engine has transferred from the part-load range A in which combustion is controlled in the special operation mode to the operating range B in which combustion is controlled in the normal operation mode at a point in time t0 when the first cylinder 2A serving as a preceding cylinder is in the exhaust stroke and the second cylinder 2B serving as a following cylinder is in the intake stroke. In this situation, the control device controls the first cylinder (preceding cylinder) 2A in the transitional operation mode in which both fuel injection and forced ignition are interrupted in the intake stroke first occurring after the point in time t0, whereas the control device causes combustion to occur continuously in the second cylinder (following cylinder) 2B by compression ignition. Subsequently, the valve stop mechanisms 35 of the two cylinders 2A, 3B switch the gas flow paths at a point in time t1 when the first cylinder (preceding cylinder) 2A is in the compression stroke occurring one combustion cycle after the beginning of control operation in the transitional operation mode.

The control device performs similar control operation in the transitional operation mode immediately after the engine has transferred from the operating range B on the high-load, high-speed side to the part-load range A. In this case, however, the control device instantly switches the gas flow paths from the independent cylinder configuration to the dual two-cylinder interconnect configuration and performs the control operation in the transitional operation mode for a specific period of time, in which the control device interrupts combustion in the preceding cylinders 2A, 2D while causing combustion to occur only in the following cylinders 2B, 2C by compression ignition.

Figure 8B:
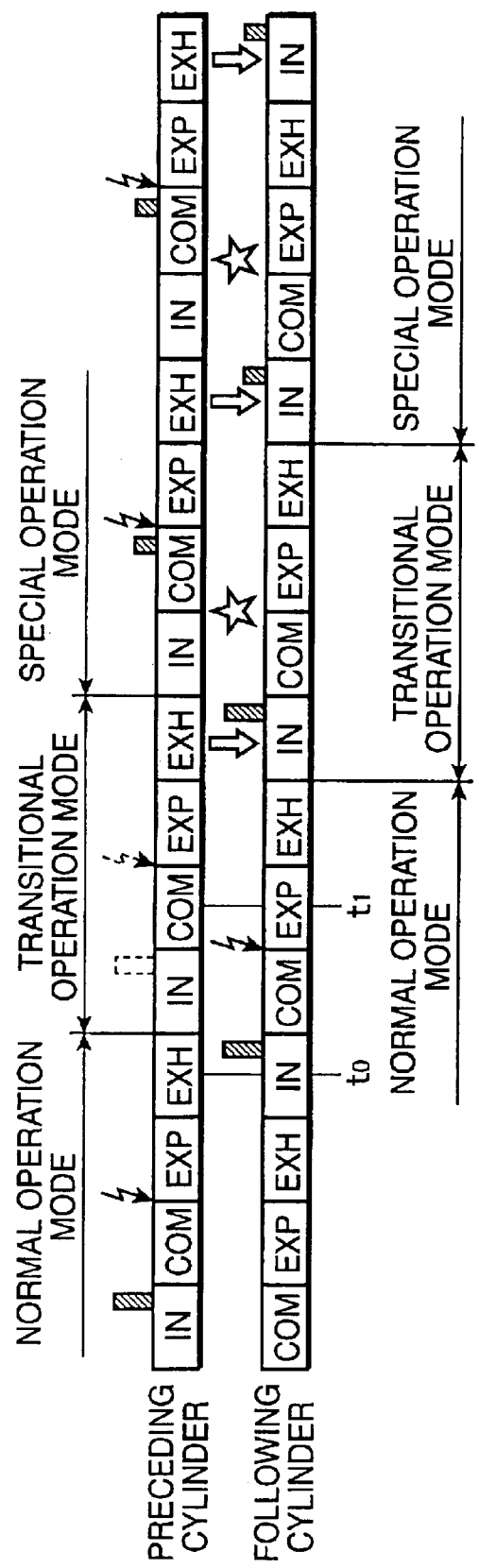

FIG. 8B shows an exemplary situation where the control device detects that the engine has transferred from the operating range B in which combustion is controlled in the normal operation mode to the part-load range A in which combustion is controlled in the special operation mode at a point in time t0 when the first cylinder 2A serving as a preceding cylinder is in the exhaust stroke and the second cylinder 2B serving as a following cylinder is in the intake stroke. In this case, the valve stop mechanisms 35 of the two cylinders 2A, 3B switch the gas flow paths at a point in time t1 when the first cylinder (preceding cylinder) 2A is in the compression stroke and the second cylinder (following cylinder) 2B is in the expansion stroke. In this situation, the control device controls the first cylinder (preceding cylinder) 2A in the transitional operation mode in which both fuel injection and forced ignition are interrupted in the intake stroke first occurring after the point in time to, whereas the control device interrupts forced ignition and begins to produce combustion in the second cylinder (following cylinder) 2B by compression ignition in the expansion stroke occurring in a combustion cycle next to the combustion cycle in which the control device has detected the transfer from the operating range B to the operating range A.

Under operating conditions in this transitional operation mode, the dual two-cylinder interconnect configuration is established by the operation mode controller which includes the valve stop mechanism controller 42 and the intake air quantity controller 43, so that substantial fresh air and gas flow paths as shown in FIG. 6 are formed as in the special operation mode. When the dual two-cylinder interconnect configuration is used in the transitional operation mode, fresh air is introduced through the intake passage 15 (arrows "a" in FIG. 6) into the preceding cylinders 2A, 2D in the intake stroke thereof. Since the preceding cylinders 2A, 2D, in which combustion has so far been produced until interrupted immediately before, retain a high-temperature atmosphere, the introduced fresh air warms up and reaches a sufficiently high temperature in the preceding cylinders 2A, 2D in this high-temperature atmosphere. Subsequently, the high-temperature fresh air discharged from the preceding cylinders 2A, 2D is introduced into the respective following cylinders 2B, 2C through the intercylinder gas channels 22 during the periods when the exhaust stroke of the preceding cylinders 2A, 2D overlaps the intake stroke of the following cylinders 2B, 2C (open arrows in FIG. 5 and arrows "b" in FIG. 6). During the intake stroke of the following cylinders 2B, 2C, the fuel is supplied in predetermined quantities to the high-temperature fresh air introduced from the preceding cylinders 2A, 2D. Then, the compression ignition is produced in the following cylinders 2B, 2C as the pressure and temperature in the combustion chambers 4 thereof increase near the top dead center in the compression stroke.

When the engine is operated in the transitional operation mode as discussed above, the high-temperature fresh air discharged from the preceding cylinders 2A, 2D is introduced directly into the respective following cylinders 2B, 2C through the intercylinder gas channels 22, so that the temperature in the combustion chambers 4 of the following cylinders 2B, 2C increases in the intake stroke. As the temperature and pressure in the following cylinders 2B, 2C which have sufficiently been heated further increase in the compression stroke, the temperature of the mixture in the combustion chambers 4 of the following cylinders 2B, 2C increases to such a level that is high enough to produce compression ignition at about the top dead center in the final part of the compression stroke. Furthermore, since the fuel injected into the following cylinders 2B, 2C in the intake stroke thereof is homogeneously distributed in the entire combustion chambers 4 of the following cylinders 2B, 2C prior to the final part of the compression stroke, there is obtained such a homogeneously dispersed mixture in the following cylinders 2B, 2C that would satisfy conditions for producing ideal simultaneous compression ignition at multiple points in each combustion chamber 4. The homogeneous mixture thus produced in the following cylinders 2B, 2C is rapidly combusted by simultaneous multi-point compression ignition. This makes it possible to prevent leakage of burned gas produced by combustion at a high air-fuel ratio into the exhaust passage 20 due to a delay in response in regulating the quantity of intake air, so that the three-way catalyst 24 disposed in the exhaust passage 20 can sufficiently exhibit its emission-cleaning performance. Furthermore, the control device of the present embodiment serves to reduce torque shocks which can cause a considerable fluctuation in engine output torque and to properly switch the gas flow paths.

During the period of transition between the operating ranges A and B, the quantity of fresh intake air becomes unstable due to the delay in response in regulating the same. Nevertheless, the arrangement of the embodiment makes it possible to prevent misfire due to a shortage of the quantity of fresh intake air and to produce combustion by compression ignition. This is because the combustion is produced only in the following cylinders 2B, 2C during the transition period.

While the control device of the invention has thus far been described with reference to the specific embodiment thereof, the invention is not limited to the aforementioned arrangement of the embodiment but may be modified in various ways within the scope of the appended claims. For example, the arrangement of the foregoing embodiment in which the gas flow paths are switched between the dual two-cylinder interconnect configuration and the independent cylinder configuration by means of the valve stop mechanisms 35 may be modified in such a way that on-off valves are provided in the intake and exhaust passages and in the intercylinder gas channels so that the gas flow paths are switched between the dual two-cylinder interconnect configuration and the independent cylinder configuration by opening and closing the intake and exhaust passages and the intercylinder gas channels by the on-off valves.

In the foregoing embodiment, combustion in the following cylinders 2B, 2C is produced by compression ignition in the entirety of the operating range A in which the special operation mode is selected.

As an alternative, this arrangement may be modified such that the engine is controlled in the normal operation mode only in part of the operating range A, that is, in an extremely low-load, low-speed operating range D shown in FIG. 4, for example, in which neither the temperature nor the pressure in the combustion chambers 4 of the following cylinders 2B, 2C could easily reach such a level that is high enough to produce compression ignition. In this alternative, the engine may be switched between operation modes for the operating range D and the operating range A via the transitional operation mode of the invention. However, it is preferable from a practical point of view that the transitional operation mode be used only when the engine is switched between the part-load range A and the operating range B in which the preceding cylinders 2A, 2D and the following cylinders 2B, 2C sufficiently warm up.

As another alternative, the arrangement of the embodiment may be modified such that the transitional operation mode is selected only when the engine is switched from the part-load range A to the operating range B on the high-load, high-speed side. According to the arrangement of this alternative, the temperature of the following cylinders 2B, 2C is already high when the transitional operation mode is selected as a result of combustion in the special operation mode in the part-load range A. Therefore, the following cylinders 2B, 2C is ready to produce combustion by compression ignition when the transitional operation mode is selected in this alternative arrangement. The invention can be implemented in a much preferable way in this alternative as it is possible to reliably control combustion by the transitional operation mode.

In a case where it is expected to be difficult to produce combustion by compression ignition in the following cylinders 2B, 2C, particularly at the switching of the operation modes between the operating range D and the operating range A, the control device may be constructed to perform a firing assist operation to facilitate the compression ignition in the following cylinders 2B, 2C. This firing assist operation for provoking the compression ignition can be performed by controlling the ignition controller 46 in such a manner that the mixture in the following cylinders 2B, 2C is ignited by the spark plugs 7 immediately before the top dead center in the compression stroke, for example. If the control device is so constructed, it is possible to prevent misfire in the following cylinders 2B, 2C and prevent deterioration of the emission-cleaning performance in a reliable and effective manner.

Now, principal features of the invention are summarized below.

In a first principal form of the invention, a control device for a four-cycle multicylinder spark-ignition engine of which individual cylinders go through successive combustion cycles with specific phase delays switches the engine according to operating conditions thereof between a normal operation mode in which an independent cylinder configuration is formed and a special operation mode in which a two-cylinder interconnect configuration is formed. The control device has a capability to switch the engine between the normal operation mode and the special operation mode via a transitional operation mode in which gas flow paths are connected to form the two-cylinder interconnect configuration and the control device interrupts combustion in the preceding cylinders while producing combustion in the following cylinders by compression ignition.

In one feature of the invention, this control device preferably includes an assist unit for inducing the compression ignition in the following cylinders, wherein the assist unit induces the compression ignition in the following cylinders in the transitional operation mode. The control device thus constructed can provoke the compression ignition in the following cylinders with the aid of the assist unit so that the mixture in the following cylinders is properly fired by the compression ignition even when fresh air is not sufficiently heated in the preceding cylinders and it is expected that the compression ignition would not easily occur in the following cylinders. This makes it possible to effectively prevent deterioration of the emission-cleaning performance.

If the engine provided with the assist unit has an operating range in which the normal operation mode is selected on a lower-load side of an operating range in which the special operation mode is selected, the control device should preferably be constructed to select the transitional operation mode only when the engine transfers from the operating range in which the special operation mode is selected to the operating range on the lower-load side in which the normal operation mode is selected. Since the engine load is higher in the operating range in which the special operation mode is selected than in the operating range in which the normal operation mode is selected, the quantity of injected fuel and the amount of heat generation caused by combustion are correspondingly larger in the operating range in which the special operation mode is selected. Thus, just before the transitional operation mode is selected, the temperature in the preceding cylinders is already relatively high and the following cylinders themselves are already heated, so that the control device can sufficiently produce the compression ignition in the following cylinders with the aid of the assist unit while interrupting combustion in the preceding cylinders. This makes it possible to prevent deterioration of the emission-cleaning performance in a reliable fashion.

In a case where the compression ignition is provoked in the following cylinders by the assist unit in the transitional operation mode, it is preferable to make the air-fuel ratio in the following cylinders higher than the stoichiometric air-fuel ratio.

If the engine has an operating range in which the normal operation mode is selected on a higher-load side of an operating range in which the special operation mode is selected, the control device should preferably be constructed to select the transitional operation mode when the engine transfers from one of the operating ranges to the other. If the control device is so constructed, a high-temperature atmosphere is produced in the preceding cylinders as the preceding cylinders are sufficiently heated by combustion therein and the following cylinders themselves are already heated just before the transitional operation mode is selected. Therefore, the control device can produce the compression ignition in the following cylinders while interrupting combustion in the preceding cylinders. This makes it possible to prevent deterioration of the emission-cleaning performance in a reliable fashion.

In one feature of the invention, this control device should preferably be constructed to select the transitional operation mode at least when the engine transfers from the operating range in which the special operation mode is selected to the operating range on the higher-load side in which the normal operation mode is selected or only when the engine transfers from the operating range in which the special operation mode is selected to the operating range on the higher-load side in which the normal operation mode is selected. If the control device is so constructed, the temperature of the following cylinders is already high when the transitional operation mode is selected as a result of combustion in the special operation mode. Therefore, the following cylinders is ready to produce combustion by compression ignition when the transitional operation mode is selected. This makes it possible to reliably control combustion by the transitional operation mode.

Alternatively, the control device may be constructed to select the transitional operation mode when the engine transfers from the operating range in which the special operation mode is selected to the operating range in which the normal operation mode is selected and when the engine transfers from the operating range in which normal operation mode is selected to the operating range in which special operation mode is selected. If the control device is so constructed, the control device always selects the transitional operation mode when the engine is switched to and from the operating range on the higher-load side in which both the quantity of injected fuel and the amount of heat generation caused by combustion are relatively large. This makes it possible to prevent deterioration of the emission-cleaning performance in a reliable fashion.

In another feature of the invention, the control device should preferably be constructed to control the engine in such a manner that the air-fuel ratio in the individual cylinders becomes equal to or lower than the stoichiometric air-fuel ratio to produce a rich mixture in the normal operation mode selected on the higher-load side and the air-fuel ratio in the following cylinders becomes approximately equal to the stoichiometric air-fuel ratio in the special operation mode.

If the engine has operating ranges in which the normal operation mode is selected on both lower-load and higher-load sides of an operating range in which the special operation mode is selected, the control device should preferably be constructed to select the transitional operation mode when the engine transfers between the operating range on the higher-load side in which the normal operation mode is selected and the operating range in which the special operating mode is selected. If the control device is so constructed, the amount of heat generation caused by combustion is larger in the operating range on the higher-load side than in the operating range on the lower-load side. A high-temperature atmosphere is produced in the preceding cylinders before the transitional operation mode is selected as the preceding cylinders are sufficiently heated by combustion therein and the following cylinders themselves are already heated. Therefore, the control device can produce the compression ignition in the following cylinders and thereby prevent deterioration of the emission-cleaning performance in a reliable fashion.

In a second principal form of the invention, a control device for a four-cycle multicylinder spark-ignition engine of which individual cylinders go through successive combustion cycles with specific phase delays switches the engine according to operating conditions thereof between a special operation mode which is selected in a part-load operating range of the engine and a normal operation mode which is selected in an operating range on a higher-load side of the operating range in which the special operation mode is selected. The control device selects a transitional operation mode, in which gas flow paths are connected to form a two-cylinder interconnect configuration and the control device interrupts combustion in the preceding cylinders while producing combustion in the following cylinders by compression ignition, at least when the engine is switched from the special operation mode to the normal operation mode.

Like the aforementioned control device of the first principal form of the invention, this control device preferably includes an assist unit for inducing the compression ignition in the following cylinders, wherein the assist unit induces the compression ignition in the transitional operation mode.

As thus far discussed, the control device of the invention for the spark-ignition engine selects the transitional operation mode when the engine is switched from the normal operation mode to the special operation mode and/or from the special operation mode to the normal operation mode. When the transitional operation mode is selected, the control device connects the gas flow paths to form the two-cylinder interconnect configuration and interrupts combustion in the preceding cylinders. Since fresh air introduced into the following cylinders is sufficiently heated in the preceding cylinders in the transitional operation mode, it becomes possible to produce compression ignition in the following cylinders. As the mixture in the following cylinders is combusted by the compression ignition in the transitional operation mode, NOx emissions from the following cylinders can be sufficiently suppressed during the period of operation mode transition. It is therefore possible to properly switch the engine between the normal operation mode and the special operation mode while preventing deterioration of the emission-cleaning performance regardless of the value of the air-fuel ratio of the mixture. Moreover, since the control device produces combustion only in the following cylinders upon interrupting combustion in the preceding cylinders in the transitional operation mode, it is possible to combust the mixture by compression ignition in a reliable fashion even in the period of operation mode transition during which the quantity of fresh intake air is unstable.

This application is based on Japanese patent application serial no. 2003-340732, filed in Japan Patent Office on Sep. 30, 2003, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A control device for a four-cycle multicylinder spark-ignition engine of which individual cylinders go through successive combustion cycles with specific phase delays,
   wherein said control device switches the engine according to operating conditions thereof between,
   a normal operation mode, in which an independent cylinder configuration is formed so that combustion occurs independently in the individual cylinders with fresh air introduced thereinto, and
   a special operation mode, in which each pair of preceding and following cylinders of which exhaust and intake strokes overlap is connected to form a two-cylinder interconnect configuration in a part-load operating range of the engine so that burned gas discharged from the preceding cylinder which is currently in the exhaust stroke is introduced into the following cylinder which is currently in the intake stroke through an intercylinder gas channel and gas discharged from the following cylinder is led to an exhaust passage, a lean mixture having an air-fuel ratio higher than the stoichiometric air-fuel ratio is combusted in the preceding cylinder, and a mixture produced by supplying fuel to the burned gas having a high air-fuel ratio introduced from the preceding cylinder is combusted in the following cylinder,
   said control device having a capability to switch the engine between the normal operation mode and the special operation mode via a transitional operation mode in which gas flow paths are connected to form the two-cylinder interconnect configuration and said control device interrupts combustion in the preceding cylinders while producing combustion in the following cylinders by compression ignition.

2. The control device for the spark-ignition engine according to claim 1, said control device comprising an assist unit for inducing the compression ignition in the following cylinders, wherein the assist unit induces the compression ignition in the following cylinders in the transitional operation mode.

3. The control device for the spark-ignition engine according to claim 2, wherein the engine has an operating range in which the normal operation mode is selected on a lower-load side of the operating range in which the special operation mode is selected, and wherein said control device selects the transitional operation mode only when the engine transfers from the operating range in which the special operation mode is selected to the operating range on the lower-load side in which the normal operation mode is selected.

4. The control device for the spark-ignition engine according to claim 2, wherein the air-fuel ratio in the following cylinders is made higher than the stoichiometric air-fuel ratio when the engine is controlled in the transitional operation mode.

5. The control device for the spark-ignition engine according to claim 1, wherein the engine has an operating range in which the normal operation mode is selected on a higher-load side of the operating range in which the special operation mode is selected, and wherein said control device selects the transitional operation mode when the engine transfers from one of the operating ranges to the other.

6. The control device for the spark-ignition engine according to claim 5, wherein said control device selects the transitional operation mode at least when the engine transfers from the operating range in which the special operation mode is selected to the operating range on the higher-load side in which the normal operation mode is selected.

7. The control device for the spark-ignition engine according to claim 6, wherein said control device selects the transitional operation mode only when the engine transfers from the operating range in which the special operation mode is selected to the operating range on the higher-load side in which the normal operation mode is selected.

8. The control device for the spark-ignition engine according to claim 6, wherein said control device selects the transitional operation mode when the engine transfers from the operating range in which the special operation mode is selected to the operating range in which the normal operation mode is selected and when the engine transfers from the operating range in which normal operation mode is selected to the operating range in which special operation mode is selected.

9. The control device for the spark-ignition engine according to claim 5, wherein said control device controls the engine in such a manner that the air-fuel ratio in the individual cylinders becomes equal to or lower than the stoichiometric air-fuel ratio to produce a rich mixture in the normal operation mode selected on the higher-load side and the air-fuel ratio in the following cylinders becomes approximately equal to the stoichiometric air-fuel ratio in the special operation mode.

10. The control device for the spark-ignition engine according to claim 1, wherein the engine has operating ranges in which the normal operation mode is selected on both lower-load and higher-load sides of the operating range in which the special operation mode is selected, and wherein said control device selects the transitional operation mode when the engine transfers from one of the operating ranges to the other between the operating range on the higher-load side in which the normal operation mode is selected and the operating range in which the special operating mode is selected.

11. A control device for a four-cycle multicylinder spark-ignition engine of which individual cylinders go through successive combustion cycles with specific phase delays, wherein said control device switches the engine according to operating conditions thereof between, a special operation mode, in which each pair of preceding and following cylinders of which exhaust and intake strokes overlap is connected to form a two-cylinder interconnect configuration in a part-load operating range of the engine so that burned gas discharged from the preceding cylinder which is currently in the exhaust stroke is introduced into the following cylinder which is currently in the intake stroke through an intercylinder gas channel and gas discharged from the following cylinder is led to an exhaust passage, a lean mixture having an air-fuel ratio higher than the stoichiometric air-fuel ratio is combusted in the preceding cylinder, and a mixture produced by supplying fuel to the burned gas having a high air-fuel ratio introduced from the preceding cylinder is combusted in the following cylinder, and a normal operation mode, in which an independent cylinder configuration is formed in an operating range on a higher-load side of the operating range in which the special operation mode is selected so that combustion occurs independently in the individual cylinders with fresh air introduced thereinto, and wherein said control device selects a transitional operation mode, in which gas flow paths are connected to form the two-cylinder interconnect configuration and said control device interrupts combustion in the preceding cylinders while producing combustion in the following cylinders by compression ignition, at least when the engine is switched from the special operation mode to the normal operation mode.

12. The control device for the spark-ignition engine according to claim 11, said control device comprising an assist unit for inducing the compression ignition in the following cylinders, wherein the assist unit induces the compression ignition in the transitional operation mode.

* * * * *